(12) United States Patent
Kekki (10) Patent No.: US 7,107,014 B2
(45) Date of Patent: Sep. 12, 2006

(54) TRANSPORTING POWER CONTROL INFORMATION

(75) Inventor: Sami Kekki, Helsinki (FI)

(73) Assignee: Nokia Corporation, Espoo (FI)

( * ) Notice: Subject to any disclaimer, the term of this patent is extended or adjusted under 35 U.S.C. 154(b) by 484 days.

(21) Appl. No.: 10/279,009

(22) Filed: Oct. 24, 2002

(65) Prior Publication Data

US 2004/0082353 A1    Apr. 29, 2004

(51) Int. Cl.
H04B 1/00         (2006.01)
H04B 7/00         (2006.01)

(52) U.S. Cl. .................. 455/69; 455/522; 455/450; 455/509

(58) Field of Classification Search ............. 455/69, 455/522, 453, 450, 451, 452.1, 435.1, 435.2, 455/446, 67.13, 502, 560, 561, 556.2, 509, 455/507; 370/537, 335, 329, 332, 320, 342, 370/412, 441, 331
See application file for complete search history.

(56) References Cited

U.S. PATENT DOCUMENTS 6,473,442 B1 * 10/2002 Lundsjo et al. ............ 370/537
6,721,295 B1 *  4/2004 Brown ........................ 370/335
6,801,512 B1 * 10/2004 Cudak et al. ............... 370/332
6,876,637 B1 *  4/2005 Belaiche et al. ............ 370/329
2001/0046878 A1   11/2001 Chang

FOREIGN PATENT DOCUMENTS

EP        1 067 704 A2    1/2001

OTHER PUBLICATIONS

3GPP: "3rdGeneration Partnership Project; Technical Specification Group Radio Access Network; UTRAN Iub/Iur interface user plane protocol for DCH data streams (Release 5)"3GPP TS 25.427 V5.0.0 (Mar. 2003); Release 5, 'Online! Mar. 2002, p. 1-34 XP002266744;pp. 1-34.

* cited by examiner

Primary Examiner—Eduard F. Urban
Assistant Examiner—John J. Lee
(74) Attorney, Agent, or Firm—Squire, Sanders & Dempsey LLP (57) ABSTRACT

A telecommunication arrangement for transporting power control information, comprising a base station, a radio network controller for controlling the base station, and where information between the base station and the radio network controller is transmitted on transport channels carried by transport bearers, each having a one-to-one relationship to a transport channel, a user equipment communicating with the base station, the base station comprises means for mapping data received from the user equipment onto transport channels. The mapping means is configured to map power control information from a transport channel onto a different transport bearer than the bearer with which the transport channel has the one-to-one relationship.

11 Claims, 6 Drawing Sheets

TRANSPORTING POWER CONTROL INFORMATION

FIELD

This invention relates to transporting power control information in a mobile communication network.

BACKGROUND

In a mobile communication system using CDMA (Code Division Multiple access), power control plays a vital role in system performance. Power control is needed both in the uplink and downlink directions. On the uplink, the aim is to receive all signals in a base station with the same signal power. Without power control, mobiles close to a base station would dominate in signal strength mobiles located further away from the base station. In CDMA systems, signals sent by one base station are orthogonal with each other but reflections of signals and signals sent by other base stations cause interference, which is why power control is needed also in the downlink direction.

There are two types of power control: open loop and closed loop. In the open loop power control, power adjustments are based on measurements of the connection at the signal-receiving end. The performance of the open-loop power control depends on the duplex mode used in the network. In a network using TDD (Time Division Duplex), the outer loop control works well, since the transmitted and received signals are sent on the same frequency. In a FDD (Frequency Division Duplex) system, however, performance of the open-loop power control is not guaranteed, since the different frequencies used for transmitting and receiving signals can be subject to different kind of interference. In the closed loop power control, the measurements regarding the transmission are sent from the receiver back to the transmitter, which can adjust its transmission power according to the received measurement information.

For instance in UMTS (Universal Mobile Telecommunication System), in the FDD mode fast closed-loop power control, i.e. inner loop power control is used. In this method, the signal-to-interference ratio is measured over one time slot, and the signal transmitting end is ordered either to increase or decrease its transmission power. In the outer loop power control method, the signal-to-interference ratio is adjusted by the base station, and the ratio is used in the fast closed-loop power control mechanism.

Basically, transportation of information in UMTS is performed basically using two types of channels, i.e. control channels and traffic channels. At the protocol level, the channels can be divided into physical channels, transport channels and logical channels. Transport channels are channels that define the radio interface transmission at the radio network layer and that are used between layer 1 and layer 2. Logical channels are used within layer 2. A transport channel defines how data is to be sent over the physical channels, whereas a logical channel defines the type of data to be sent.

Terminal equipment can simultaneously have several dedicated connections active, for instance some connections for real-time speech transmission and some for non-real-time data transmission. For instance, in the UMTS system's FDD mode on the uplink, this would result in having several DPDCH (Dedicated Physical Data Channel) channels in the physical layer, which channels are mapped onto corresponding transport channels for the transport network layer transmission. The transport channels are conveyed by transport bearers, each of which typically transmits its own power control information in the form of indicators, such as CRCI (Cyclic Redundancy Check Indicator) and QE (Quality Estimate). In the known solutions, the power control information is transported in the transport bearers real-time, not taking into account whether the corresponding transport channel is allocated for real-time or for non-real-time information.

The current solution for transporting power control information is poorly suited for a normal usage situation of a mobile terminal, where real-time and non-real-time applications can be active at the same time. The current solutions are not optimized for the usage of an important resource in a telecommunication network, i.e. bandwidth.

BRIEF DESCRIPTION

It is an object of the present invention to introduce a method and an arrangement for power control in a mobile communication network, which enable bandwidth savings in the transport network layer.

This is achieved with a method for transporting power control information in a mobile communication network, in which method one or more connections for transporting information can be established between user equipment and the network, and where information belonging to a connection is transported between a base station and a radio network controller on a transport channel having a one-to-one relationship to a transport bearer, where the method comprises mapping power control information between a transport channel and a transport bearer other than the transport bearer having the one-to-one relationship to the transport channel.

The invention also relates to a telecommunication arrangement for transporting power control information, comprising a base station, a radio network controller for controlling the base station, and wherein information between the base station and the radio network controller is transmitted on transport channels carried by transport bearers, each having a one-to-one relationship to a transport channel, user equipment communicating with the base station, the base station comprises means for mapping data between the user equipment and transport channels, wherein the mapping means is configured to map power control information between a transport channel and a transport bearer other than the bearer with which the transport channel has the one-to-one relationship.

Embodiments of the invention are described in the attached specification and claims.

The invention relates to transporting power control information in a mobile communication system. The mobile communication system can be for instance UMTS, but the invention is not restricted thereto.

The invention relates to transmission of power control information in a mobile communication system, where user equipment, such as a mobile station, has at least one connection to the network. The inventive idea can be utilized when power control information is transmitted in the uplink or in the downlink. The connections can be connections for transporting real-time information, such as speech, or they can be connections for transporting non-real-time information, such as data. The invention can be applied to channels that are either coordinated or non-coordinated with each other. A set of coordinated channels, such as dedicated channels (DCH), is a set of dedicated transport channels that are always established and released in combination. Individual DCHs within a set of coordinated DCHs cannot be operated on individually; if, for example, the establishment of one DCH fails, the establishment of all other DCHs in the set of co-ordinated DCHs is unsuccessful. A set of coordinated DCHs is transferred over one transport bearer whereas non-coordinated DCHs have a one-to-one relationship to transport bearers.

Each transport channel carries information used in power control. Such information can contain for instance indicators for cyclic redundancy check or quality information. In the invention, power control information from one or more transport channels is collected to one transport bearer at a transport network level. In an embodiment of the invention, the quality information is collected to a transport bearer which has a one-to-one relationship to a transport channel established for the user equipment for transporting user information. For instance, if a user has three transport channels established during a session, the power control information is gathered to the transport bearer which corresponds to one of the transport channels. The transport bearer to which information is gathered can be, for instance, the transport bearer that was established first. In another embodiment of the invention, a new transport bearer is established for transporting the power control information. The term "transport channel" can here also include a set of coordinated channels. Then, if a user has a set of non real-time coordinated channels allocated, the power control information thereon can be transported over a new transport bearer. This enables the power control information to be sent real-time although the user data were transported non-real-time.

The invention is realized for instance in a base station and in a radio network controller of a telecommunication network. The base station contains means for mapping power control information, the means for mapping being capable of either collecting power control information to an already established transport bearer or mapping the information to a new bearer specially established for transporting power control information.

Several advantages can be achieved using the method and the arrangement according to the invention. For instance, decoupling the transport of power control information and the transport of corresponding transport channels serving non-real time users, allows the transport channels to be conveyed over non-real time transport bearers. The application of non-real time transport bearers (i.e. transport bearers with a less stringent delay requirement) for non-real time services allows the utilisation of statistical multiplexing in the transport network. Depending on the ratio of the volumes of real time and non-real time traffic, the statistical multiplexing gain can be significant, resulting in increased bandwidth efficiency in the transport network.

FIGURES

In the following, the invention will be described in greater detail by means of the preferred embodiments and with reference to the attached drawings, in which.

DESCRIPTION OF EMBODIMENTS

Figure 1:
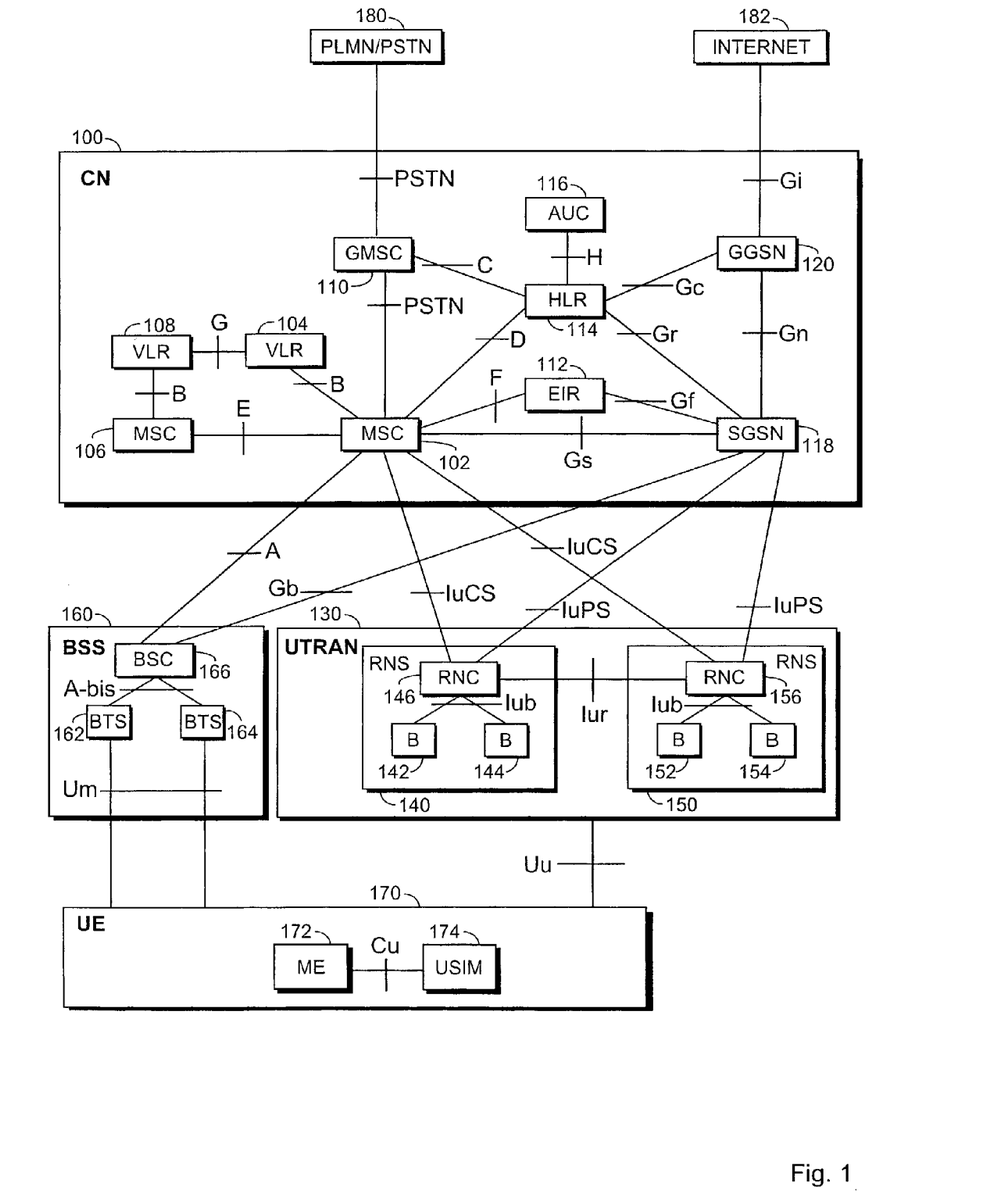
FIG. 1 shows an embodiment of a telecommunication network.

Because second-generation radio systems and third-generation radio systems and various combinations thereof, i.e. so-called 2.5 generation radio systems, are already being used worldwide and continuously being developed, embodiments are described in the radio system illustrated in FIG. 1, wherein network elements of different generations coexist. In the following description, GSM (Global System for Mobile Communications) represents the second-generation radio systems. A GSM-based radio system, which employs EDGE (Enhanced Data Rates for Global Evolution) technology for increasing the data transmission rate and which can also be used for implementing packet transmission in a GPRS (General Packet Radio System) system, represents the 2.5 generation radio systems. A radio system known at least as IMT-2000 (International Mobile Telecommunications 2000) and UMTS represents the third-generation radio systems. The embodiments are not, however, restricted to these systems described by way of example, but a person skilled in the art can also apply the instructions also to other radio systems containing corresponding characteristics.

FIG. 1 is a simplified block diagram showing the most important parts of a radio system and the interfaces there between at a network-element level. The structure and functions of the network elements are not described in detail, because they are generally known.

The main parts of a radio system are a core network (CN) 100, a radio access network 130/160 and user equipment 170, which can be for instance a mobile phone. A radio access network 160 called UTRAN (UMTS Terrestrial Radio Access Network) belongs to the third generation and is implemented by wideband code division multiple access (WCDMA) technology. FIG. 1 also shows a base station system 160 which belongs to the 2/2.5 generation and is implemented by time division multiple access (TDMA) technology.

The structure of the core network 100 corresponds to a combined structure of the GSM and GPRS systems. The GSM network elements are responsible for establishing circuit-switched connections, and the GPRS network elements are responsible for establishing packet-switched connections; however some of the network elements can be found in both systems. A mobile services switching centre (MSC) 102 is the centre point of the circuit-switched side of the core network 100. The same mobile services switching centre 102 can be used to serve the connections of both the radio access network 130 and the base station system 160. The tasks of the mobile services switching centre 102 include switching, paging, user equipment location registration, handover management, collection of subscriber billing information, encryption parameter management, frequency allocation management, and echo cancellation.

The number of mobile services switching centres 102 may vary. A small network operator may only have one mobile services switching centre 102, but large core networks 100 may comprise several ones. FIG. 1 shows a second mobile services switching centre 106 but to keep FIG. 1 sufficiently clear, its connections to other network elements are not shown.

Large core networks 100 may have a separate gateway mobile services switching centre (GMSC) 110, which takes care of circuit-switched connections between the core network 100 and external networks 180. An external network 180 can be for instance a public land mobile network (PLMN) or a public switched telephone network (PSTN). A home location register (HLR) 114 contains a permanent subscriber register and a visitor location register (VLR) 102, 104 contains roaming information on the user equipment 170 in the area of the mobile services switching centre 102. An equipment identity register (EIR) 112 contains the international mobile equipment identities (IMEI) of the user equipment 170 used in the radio system. An authentication centre (AuC) 116 is always physically located in the same place as the home location register 114, and contains subscriber authentication data.

A serving GPRS support node (SGSN) 118 is the centre point of the packet-switched side of the core network 100. The main task of the serving GPRS support node 118 is to transmit and receive packets with the user equipment 170 supporting packet-switched transmission by using the radio access network 130 or the base station system 160. A gateway GPRS support node (GGSN) 120 is the packet-switched side counterpart to the GMSC 110 of the circuit-switched side with the exception, however, that the GGSN 120 must also be capable of routing traffic from the core network 100 to external networks 182, whereas the GMSC 110 only routes incoming traffic. In FIG. 1, the Internet represents the external network 182.

The base station system 160 comprises a base station controller (BSC) 166 and base transceiver stations (BTS) 162, 164. The BSC 166 controls the BTSs 162, 164 by for instance taking care of tasks, such as radio resource management of the base transceiver station 162, 164, inter-cell handovers, frequency control, management of frequency hopping sequences, time delay measurement on the uplink, implementation of the operation and maintenance interface, and power control.

The base transceiver station 162, 164 contains at least one transceiver, which provides one carrier, i.e. eight time slots, i.e. eight physical channels. Typically, one base transceiver station 162, 164 serves one cell, but it is also possible to have a solution in which one base transceiver station 162, 164 serves several sectored cells. The diameter of a cell can vary from a few meters to dozens of kilometers. The base transceiver station 162, 164 also comprises a transcoder, which converts the speech-coding format used in the radio system to that used in the public switched telephone network and vice versa.

The UTRAN 130 is a radio access network of an UMTS network. The radio access network 130 is made up of radio network subsystems 140 and 150. The UTRAN contains radio network controllers (RNC) 146, 156 and base stations 142 to 144, 152 to 154, which are often referred to using a logical concept "Node B". The interface between two RNCs is called Iur and the interface between a RNC and a Node B is called Iub. The main task of the RNC is to control the base stations, the task containing functions such as macro diversity combining/splitting, handling of soft handover, traffic management of common channels and uplink outer-loop power control. A Node B or a base station performs tasks such as inner-loop power control, reporting of uplink interference measurements and downlink power information, mapping information between transport channels and physical channels and RF processing.

Although base stations 162 to 164 of the GSM network and the base stations 142 to 144, 152 to 154 of the UMTS network are shown to be separate in FIG. 1, solutions also exist where the same physical device performs tasks presumed by a GSM network and an UMTS network, for instance the task of implementing both the TDMA and WCDMA radio interfaces simultaneously.

The user equipment 170 comprises two parts: mobile equipment (ME) 172 and a UMTS subscriber identity module (USIM) 174. The USIM 174 contains information related to the user and information related to information security in particular, for instance, an encryption algorithm. The GSM system naturally uses its own identity module. The user equipment 170 contains at least one transceiver for establishing a radio link to the radio access network 130 or the base station system 160.

In the UMTS, the most important interfaces are the Iu interface between the core network and the radio access network, which is divided into the interface IuCS on the circuit-switched side and the interface IuPS on the packet-switched side, and the Uu interface between the radio access network and the user equipment. In the GSM, the most important interfaces are interface A between the base station controller and the mobile services switching centre, the interface Gb between the base station controller and the serving GPRS support node, and the interface Um between the base transceiver station and the user equipment. The interface defines what kind of messages different network elements can use in communicating with each other. These interfaces are further discussed in conjunction with FIGS. 2A, 2B and 3.

Figure 2A:
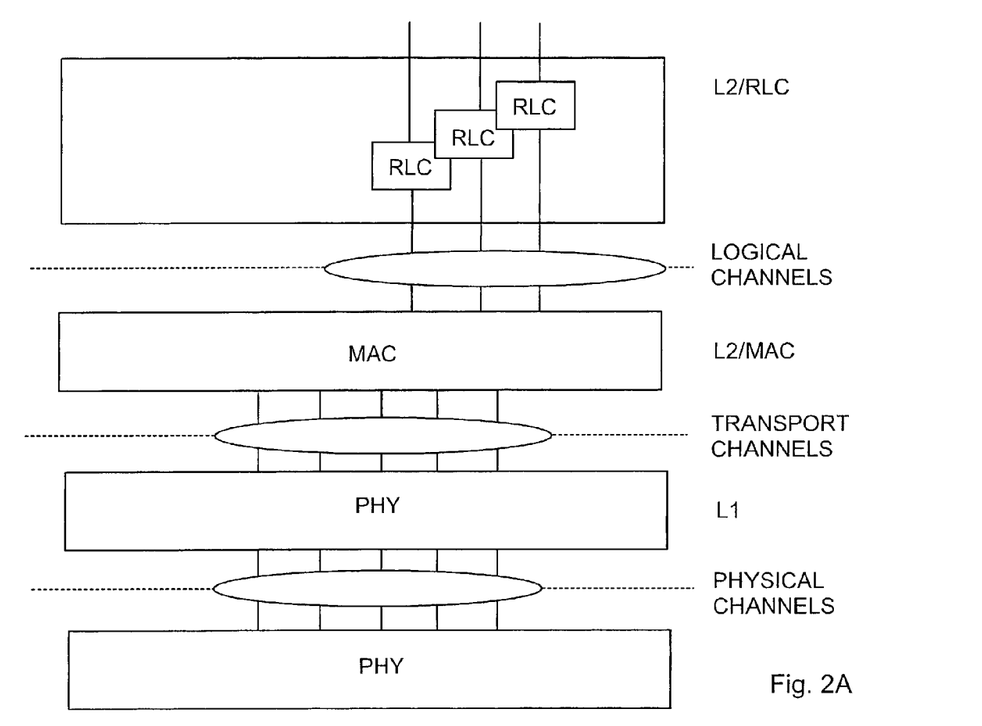
FIG. 2A shows an example of a part of a protocol structure in a telecommunication network.

FIG. 2A depicts a part of the radio interface protocol architecture in the UMTS system. In the context of a physical radio network, the Radio interface Medium Access Control (MAC) protocol and the Radio interface Physical Layer (PHY) protocol reside in separate network elements, MAC in the RNC and PHY in Node B. In the UMTS, this applies for all transport channels, except for High Speed Downlink Shared Channel (HS-DSCH). As FIG. 2A shows, the channels between the MAC layer and the PHY layer are called transport channels and the channels defining the radio interface are called physical channels.

To give examples of different channels and their tasks, some of the channels will be briefly discussed in the following. At the level of logical channels, there is a DCCH (Dedicated Control Channel), which is a bidirectional point-to-point channel transferring dedicated control information. A CCCH (Common Control Channel) is for transferring point-to-multipoint control information. A DTCH (Dedicated Traffic Channel) is a point-to-point dedicated transport channel used for transporting traffic data. The transport channels define how the data is to be sent on the physical layer. Transport channels are either dedicated channels or common channels, in the latter case they can transport several users' data simultaneously. The transport channels are all unidirectional. A CPCH (Common Packet Channel) is a channel for bursty data traffic. A DCH (Dedicated Channel) is dedicated channel for use of one user terminal only. FAUSCH stands for Fast Uplink Signalling Channel.

The invention relates to the way in which the transport channel data is conveyed over the interface between Node B and the radio network controller (Iub interface) as well as between the two radio network controllers (Iur interface between the Drift RNC and the Serving RNC). On these interfaces, the transport channel data is conveyed by the Frame Protocol, which is defined for all transport channels, both for common channels and for dedicated channels. The frame protocol PDUs (Protocol Data Unit) or frames are conveyed on Iub and Iur by transport bearers. A transport bearer represents a connection in the transport network of the radio access network, offering the transport service for the frame protocol. The transport bearer can be for instance of type AAL2 or UDP/IP. An AAL2 connection can be the transport bearer in the case of ATM transport option while a UDP/IP connection can be the transport bearer in the case of IP transport.

The transport channel data is conveyed in the payload part of the frame. A frame header conveys additional control information related to the given transport channel and its processing in MAC and PHY protocol layers. Additionally, the frame may have an optional tail conveying the CRC information protecting the payload of the frame. In an embodiment of the invention, relevant information in the frame header is the Quality Estimate and CRC Indicator parameters. This information is used by the Outer Loop Power Control to determine the quality of the radio link and thus the need for any SIR adjustments.

Figure 2B:
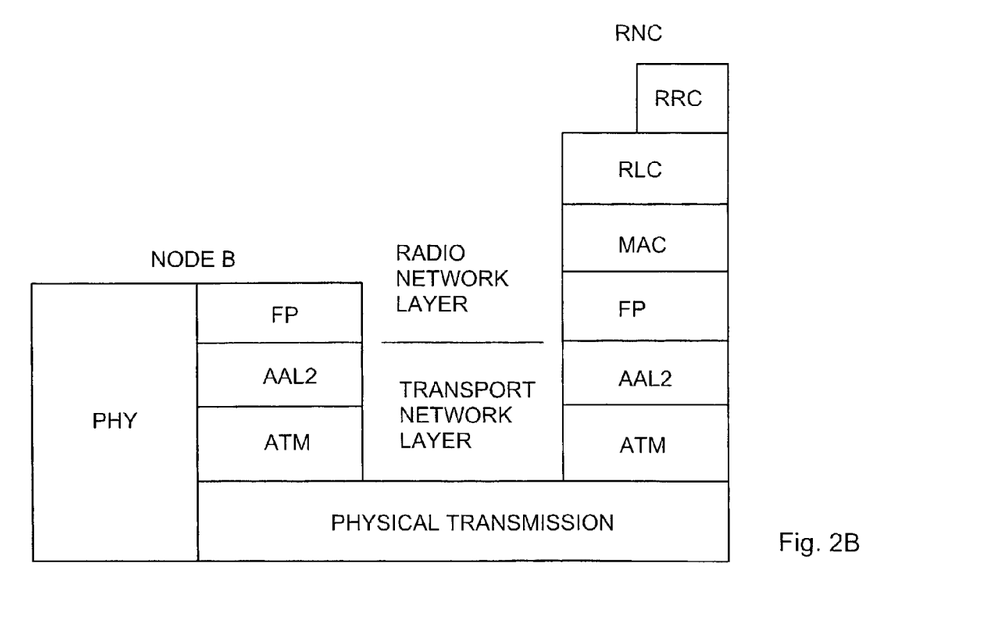
FIG. 2B shows another view to a protocol structure in a telecommunication network.
Figure 2C:
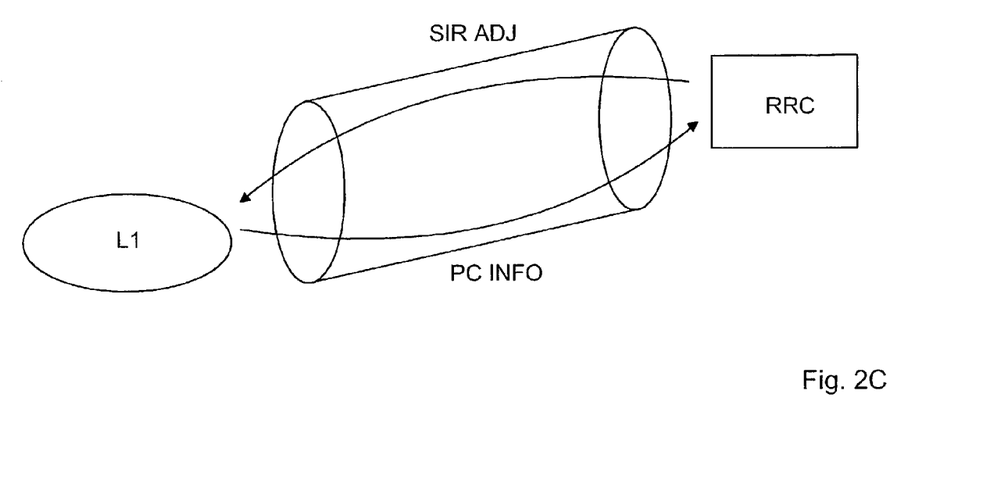
FIG. 2C illustrates outer loop power control in a telecommunication network.

FIG. 2C illustrates the outer loop power control as it is seen on Iub and Iur interfaces. The Radio Resource Control (RRC) protocol in the RNC sets the target SIR (Signal to Interference Ratio) for the radio receiver in Node B. This setting is carried out based on the quality information sent by Node B. The quality information, such as the QE and CRCI, is conveyed on the uplink (Node B→RNC) in the FP-PDU header. The updated SIR target setting is conveyed on the downlink (RNC→Node B) in dedicated frame protocol control frame outer loop power control.

FIG. 2B depicts the overall protocol architecture in the radio access network between the RNC and Node B. The protocol layers RRC, RLS and MAC are part of the WCDMA (Wideband CDMA) radio interface protocol architecture while the frame protocol is an auxiliary radio network layer (RNL) protocol that is not visible in the WCDMA radio interface. In other words, there is no FP termination in the UE. The Transport Network Layer (TNL) contains all protocols that are specific to transmission and transport of the RAN interfaces other than the radio interface. Transport bearers are provided by the transport network layer and the user of the transport bearer is the frame protocol of the radio network layer.

Figure 3:
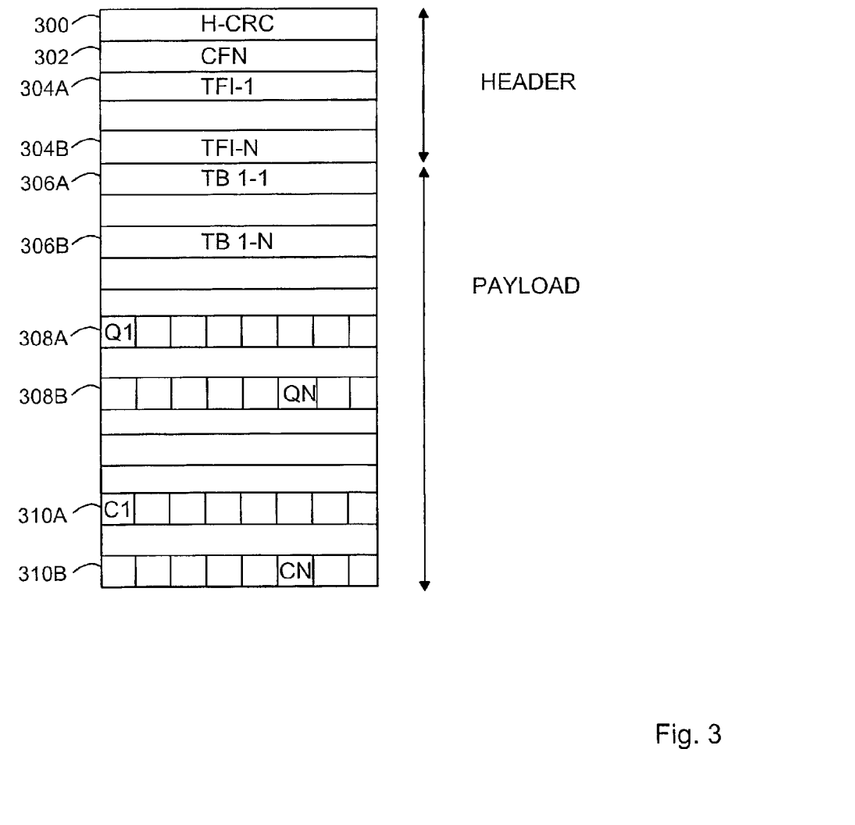
FIG. 3 shows an example of a transmission frame structure.

FIG. 3 shows a possible structure for a frame protocol frame in the transport network layer used for carrying information from several DCHs, for instance. The purpose of FIG. 3 is to give an idea of the contents of a frame; however only essential contents from the point of view of the invention are shown.

The frame contains a header CRC (H-CRC) 300, which is a checksum over the header. A CFN (Connection Frame Number) 302 indicates to which radio frame the first data was received on the uplink. A TFI (Transport Format Indicator) 304A, 304B is a local number of the transport format used for the transmission time interval. There is a TFI indicator for each DCH that is multiplexed into the same transport bearer. TFI-1 304A denotes the TFI of the first DCH and TFI-N 304N the TFI of the last DCH, respectively. The running number for DCHs thus indicates the order in which the channels have been established, the first DCH being the DCH that has been first established first. A TB (Transport Block) contains data sent in the transport channel, a TB 1—1 306A meaning the first transport block in the first channel and TB 1-N 306B meaning the first TB in the last channel allocated for the user equipment. Quality estimates (Q1–QN) 308A, 308B carry information on the BER (Bit Error Rate) of the transport channel. Q1 is the quality estimate of the transport block TB 1—1 and QN is the quality estimate of a block TB (N—N). A CRCI (Cyclic Redunancy Checsum Indicator) denoted by C1 relates to the TB 1—1, and CN relates to TB N—N, respectively.

Figure 4:
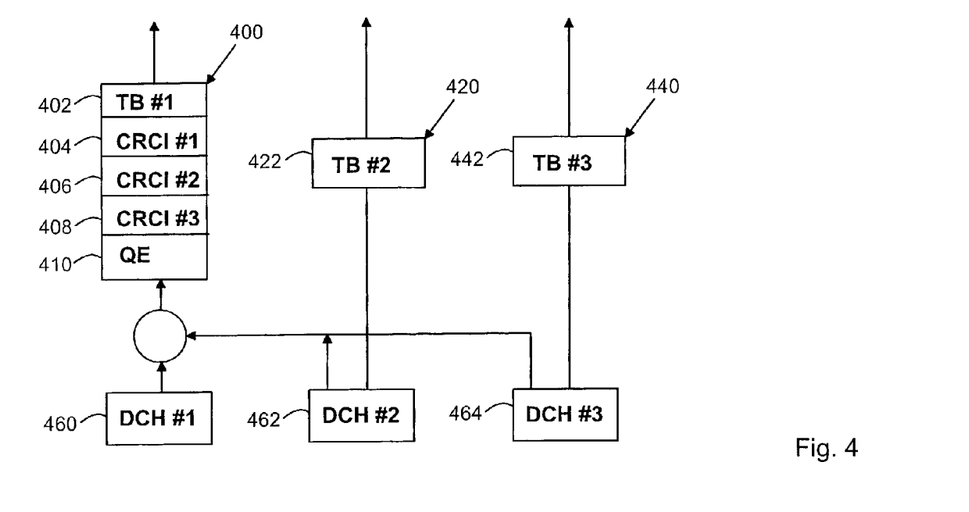
FIG. 4 shows an embodiment of channel mapping according to the invention.
Figure 5:
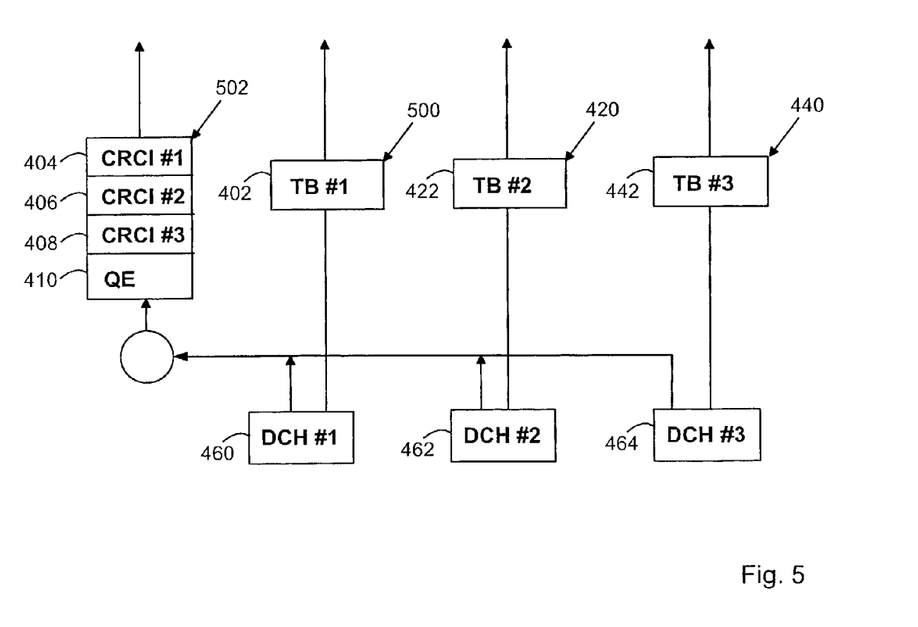
FIG. 5 shows another example of channel mapping according to the invention.

FIGS. 4 and 5 demonstrate two possible embodiments of the invention. The figures show three dedicated transport channels 460, 462, 464 allocated for user equipment. One or more of the transport channels 460 to 464 can form a set of coordinated channels. FIG. 4 shows how power control information 406 to 408, which would normally be transported in transport bearers 420, 440, is moved to a transport bearer 400. Similarly quality estimates (QE) relating to the transport channels 462, 464 are moved into the transport bearer 400, although this is not specifically shown in FIG. 1. The user data 402, 422, 442 such as traffic data is transported in transport bearers that have the one-to-one relationship to transport channels. Then, for instance, the user data 422 from traffic channel 462 is mapped to the transport bearer 420. The idea in this embodiment is to utilize an already established channel where a one-to-one relationship exists between the first transport channel 460 and the first transport bearer 400. A one-to-one relationship can here be interpreted such that the bearer having the one-to-one relationship with a physical/transport channel carries the user traffic data of the physical/transport channel. The data transported in the first transport bearer 400 thus contains a group of CRCI indicators 406 that were originally received in the second transport channel 462 and, correspondingly, CRCI indicators 406 were originally received in the third transport channel 464. The CRCI indicator groups 404 to 408 mapped to the first transport bearer 400 can also contain information/indicator on the transport channel they relate to.

FIG. 5 shows another embodiment of the quality information mapping according to the invention. In FIG. 5, a new transport bearer 502 has been established for transportation of quality information, and quality information from all three communication channels 460 to 464 is moved to this new bearer 502. The new bearer 502 has no one-to-one relationship to any of the transport channels 460 to 464 or to the original transport bearers 500, 420, 440. The actual traffic data contents, i.e. transport blocks TB #1, TB #2 and TB #3 are not mapped to this common bearer 502 but are transported in bearers 500, 420 and 440, respectively.

Figure 6:
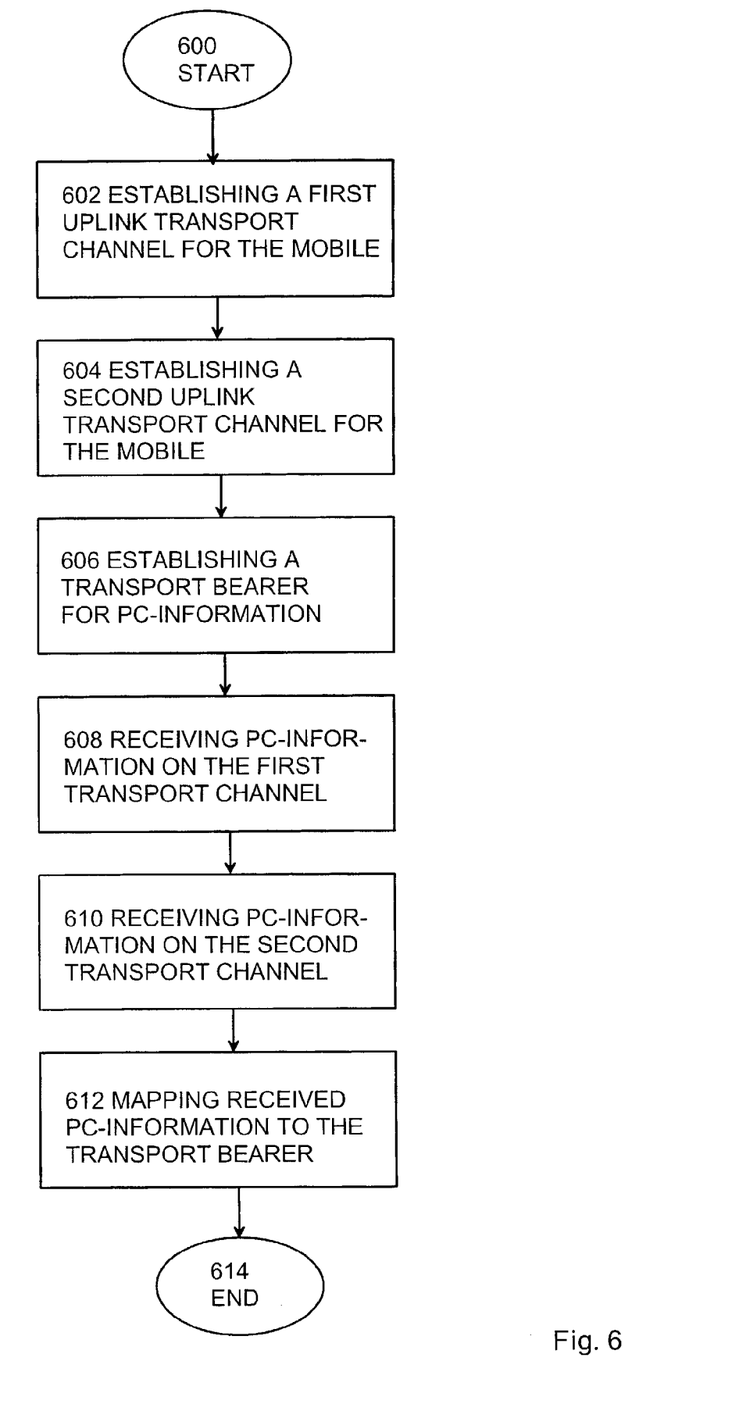
FIG. 6 shows an example of a method according to the invention.

FIG. 6 illustrates an embodiment of a method according to the invention. In method steps 602 and 604, a first transport channel and a second transport channel are established in the uplink direction for a user terminal. The term "channel" here refers to a transport channel, which is established along with the rest of the connection link in order to realize a link for data transmission between a telecommunication network and a terminal using the network. It is obvious that the invention is not restricted to the number of simultaneous channels to be established for the user terminal but the only important point for the realization of the invention is the establishment of at least one connection link. The channels established and used according to the invention can be non-coordinated channels or sets of coordinated channels. The channels may be real-time or non-real-time channels. The terminal can also have coordinated channels or some other channels active, which are not handled in accordance with the invention.

In method step 606, a transport bearer for the transportation of power control information is established. The bearer established is a new and separate bearer not having a one-to-one relationship with transport channels established in steps 602 and 604. A one-to-one relationship here means that if, for instance, all the user information transported along a channel established in step 602 were transported in the new transport bearer, then the channel and the bearer would have a one-to-one relationship. In method steps 608 and 610, information is received along the first and second user channels. In step 612, the information received in steps 608 and 610 is mapped to the transport bearer established in step 606. Obviously, the order in which channels and bearers are established is not important for the invention.

The user equipment may have real-time and non-real-time connections active at the same time. If there are several non-real-time connections active, these may have different delay requirements for the data to be transmitted. The delay requirement is controlled by a parameter called TTI (Transmission Time Interval), which determines how often a packet shall be transmitted. For instance, the mobile may have three connections active, one having a TTI of 20 ms, the second having a TTI of 40 ms and the third connection having a TTI of 60 ms. If these transport channels are mapped to a common transport bearer on the uplink, the common transport bearer shall obeys the smallest TTI value in the group of transport channels. In the given example, the TTI in the common transport bearer would be 20 ms.

Figure 7:
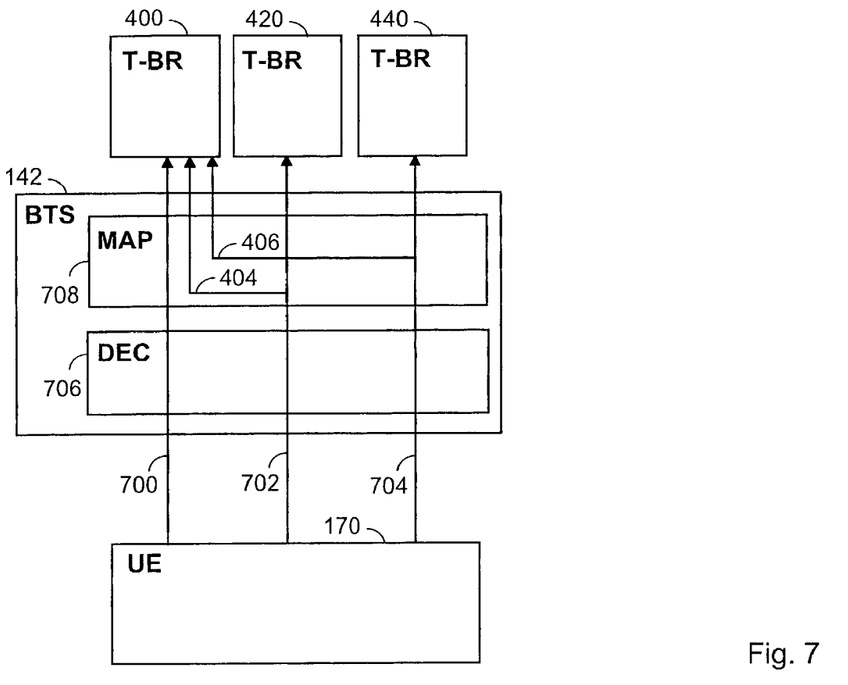
FIG. 7 shows an example of an arrangement according to the invention.

FIG. 7 illustrates an embodiment of an arrangement according to the invention. It is obvious to one skilled in the art that FIG. 7 is not a comprehensive presentation of the structure of a base station or mobile equipment but, in order to obtain simplicity in the presentation, only parts essential to the invention are shown. In a mobile communication session, user equipment 170 has three physical channels 700 to 704 active towards a base station 142, which forms the end-point for the radio interface. The base station contains means for decoding 706 the information streams received in the physical channels 700 to 704. The base station also demultiplexes the data received in the physical channels 700 to 704 in order to separate the data belonging to different transport channels. The base station 142 also contains means for mapping 708, which map power control information from the transport channels to transport bearers. As FIG. 7 illustrates, the mapping means 708 maps power control information 404 and 406 from channels 700 to 704 to a transport bearer 400 having a one-to-one relationship with the transport/physical channel 700. In another embodiment of the invention, the mapping means map of power control information from all transport/physical channels 700 to 704 to a specific transport bearer, which is established for carrying power control information. In this embodiment, the base station comprises means for establishing a transport bearer for carrying power control information.

The features of an arrangement according to the invention can be implemented for instance by software, as ASIC (Application Specific Integrated Circuit) or as separate logic components.

Even though the invention has been explained in the above with reference to examples in accordance with the accompanying drawings, it is obvious that the invention is not restricted thereto but can be modified in many ways within the scope of the inventive idea disclosed in the attached claims.

The invention claimed is:

1. A method for transporting power control information in a mobile communication network, in which method one or more connections for transporting information can be established between user equipment and the network, and where information belonging to a connection is transported between a base station and a radio network controller on a transport channel having a one-to-one relationship to a transport bearer, the method comprising:
   mapping power control information between the transport channel and a transport bearer other than the transport bearer having the one-to-one relationship to the transport channel; and
   establishing an auxiliary transport bearer for carrying power control information, wherein in the mapping of power control information, mapping power control information between at least one transport channel and the auxiliary transport bearer that does not have a one-to-one relationship to anyone of the at least one transport channel.

2. A method for transporting power control information in a mobile communication network, in which method one or more connections for transporting information can be established between user equipment and the network, and where information belonging to a connection is transported between a base station and a radio network controller on a transport channel having a one-to-one relationship to a transport bearer, the method comprising:
   mapping power control information between the transport channel and a transport bearer other than the transport bearer having the one-to-one relationship to the transport channel,
   wherein in the mapping of power control information, mapping power control information between the transport bearer and at least two non-real time transport channels, each having a channel specific transmission interval requirement, and
   applying in the transport bearer a smallest transmission time requirement of the transport channels.

3. A method according to claim 2, wherein in the mapping of power control information, mapping power control information between at least two transport channels and a transport bearer having a one-to-one relationship to one of the at least two transport channels.

4. A method according to claim 2, wherein in the mapping of power control information, the transport bearer is the first established transport bearer for the user equipment.

5. A method according to claim 2, comprising:
   using, in the transport bearer, an identifier for identifying the trans-port channel to which the power control information relates.

6. A method according to claim 2, wherein the power control information is transported real-time.

7. A method according to claim 2, wherein the power control information transported contains a cyclic redundancy check indicator (CRCI) or a quality estimate (QE).

8. A method according to claim 2, wherein in the mapping of power control information, mapping power control information between a trans-port bearer and at least two non-coordinated transport channels.

9. A method according to claim 2, wherein Frame Protocol is used in the transport bearer transportation.

10. An arrangement for transporting power control information, comprising:
   a base station;
   a radio network controller for controlling the base station, and wherein information between the base station and the radio network controller is transmitted on transport channels carried by transport bearers, each having a one-to-one relationship to a transport channel;
   user equipment communicating with the base station;
   the base station comprises means for mapping data between the user equipment and transport channels, wherein the mapping means is configured to map power control information between a transport channel and a transport bearer other than the bearer with which the transport channel has the one-to-one relationship; and means for establishing an auxiliary transport bearer for carrying power control information, and wherein the mapping means is configured to map power control information between at least one transport channel and the auxiliary transport bearer that does not have a one-to-one relationship to anyone of the at least one transport channel.

11. An arrangement for transporting power control information, comprising:

a base station;

a radio network controller for controlling the base station, and wherein information between the base station and the radio network controller is transmitted on transport channels carried by transport bearers, each having a one-to-one relationship to a transport channel;

user equipment communicating with the base station;

the base station comprises means for mapping data between the user equipment and transport channels, wherein the mapping means is configured to map power control information between a transport channel and a transport bearer other than the bearer with which the transport channel has the one-to-one relationship, wherein the arrangement is configured to transport in the same transport bearer power control information between the transport bearer and at least two non-real-time transport channels, each having a channel specific transmission interval requirement, and apply in the transport bearer the smallest transmission time requirement of the non-real-time transport channels.

* * * * *